United States Patent [19]

Botts

[11] 4,284,900
[45] Aug. 18, 1981

[54] CLOSED LOOP ENERGY CONVERSION SYSTEM

[76] Inventor: Elton M. Botts, P.O. Box 615, Mattoon, Ill. 61938

[21] Appl. No.: 18,588

[22] Filed: Mar. 7, 1979

[51] Int. Cl.³ .............................................. F03B 13/06
[52] U.S. Cl. .................................... 290/43; 290/1 R; 290/54
[58] Field of Search .................... 290/1, 2, 4, 43, 52, 290/54

[56] References Cited

U.S. PATENT DOCUMENTS

| | | | |
|---|---|---|---|
| 2,962,599 | 11/1960 | Pirkey | 290/43 X |
| 3,459,953 | 8/1969 | Hughes et al. | 290/52 X |
| 3,754,147 | 8/1973 | Hancock et al. | 290/1 X |
| 3,939,356 | 2/1976 | Loane | 290/54 X |
| 4,109,160 | 8/1978 | Goto et al. | 290/52 |
| 4,161,657 | 7/1979 | Shaffer, Jr. | 290/1 R |

*Primary Examiner*—Stanley J. Witkowski
*Assistant Examiner*—W. E. Duncanson, Jr.
*Attorney, Agent, or Firm*—Harvey B. Jacobson

[57] ABSTRACT

An energy conversion system utilizing gravity flow of water from a high elevation to sea level utilizing gravity to provide large pressure gradients in pipe lines as large quantities of water move from a high elevation at low pressure to low elevations at high pressure and then move under controlled conditions to low atmosphere pressure to operate electrical generators to generate large amounts of electrical current which can be effectively used for electrolysis separation of large volumes of hydrogen gas and oxygen from water and for other purposes. The water can be used for direct consumption, irrigation in agricultural areas, industrial use, fresh water aquaculture, stored in mass volume for future needs in aquifers or for any other purpose for which fresh water may be used for human needs either directly or indirectly with the fresh unpolluted water being easily conveyed into populated plains and coastal regions where such regions lay between wet mountainous regions and sea coasts or any other such area that would be at a sufficiently lower elevation to receive flow by gravity. Large volumes of electrical energy may be produced by the flow rate and differential pressure across hydroelectrical turbine blades whether by in-line direct methods or turbine tip high leverage systems both of which are well-known in this field. The separation of large volumes of hydrogen and oxygen gas by electrolysis methods provides a clean burning energy source which can be provided at varous locations adjacent use sites. The natural weather cycle provides a plentiful supply of water at high elevations in those geographical areas in which the present system is used and thus provides a self-perpetuating, closed loop system using gravity as the source of energy for the operation of the system.

6 Claims, 3 Drawing Figures

CLOSED LOOP ENERGY CONVERSION SYSTEM

BACKGROUND OF THE INVENTION

1. Field of the Invention

The present invention generally relates to an energy system using gravity as the source of energy for operation of the systems which includes the gravity flow of large quantities of water to generate large amounts of electrical energy thereby facilitating the electrolysis separation of large volumes of hydrogen gas and oxygen gas from water and at the same time providing electrical energy for any desired use and large quantities of fresh unpolluted water which can be used for various purposes and stored in underground aquifers or other storage areas between wet mountainous regions and coastal regions at a substantially lower elevation than the mountainous regions.

DISCLOSURE STATEMENT

The use of impounded water at a high elevation to generate electrical energy as the water is released from impoundment has been successfully used in many hydroelectrical energy systems. In such systems, it is conventional for a dam to be provided on a flowing river, stream, or the like, to impound the water and form an artificial lake, reservoir, or the like. At the base of the dam or adjacent thereto, hydroelectric turbines are driven by water passing through spillways or other passageways and then discharging back into the flowing river below the dam. While relatively large quantities of water can be impounded and used to drive electrical generators, the difference in elevation and pressure differential is relatively small in view of the limited vertical height of the hydrostatic water head. In addition, evaporation losses occur throughout this system since the water is contained in a pipeline or passageway for only a short distance from the inlet on the upstream side of the dam to the generator turbines located at the downstream side of the dam. Also, in view of the location of such dams in remote areas, it is usually necessary to transmit the electrical energy over high voltage power lines for relatively long distances and the water follows its natural course downstream for discharge into the ocean at sea level.

SUMMARY OF THE INVENTION

The hydrostatic pressure of water when confined will exert 433 psi for each 1,000 feet of vertical height when such columns of water are linearly contained reasonably near sea level and in a direction parallel with a straight line extending from the center of the earth to any point in space so that any column of water contained in a pipeline with an elevation drop of 1,000 feet at one end, regardless of the length, will exert 433 psi at the interface between the contained water and the inside walls of the pipeline. At sea level, atmospheric pressure exerted against the interface between the outside surface of the pipeline walls and the sea level atmosphere is 14.7 psi thereby providing a pressure differential between the inside water and the outside atmosphere of 418.3 psi for each 1,000 feet of water column and such pressure differential will perpetually maintain itself so long as the conditions are maintained, due to the gravity constant of the earth and, of course, any variation in the atmospheric pressure or earth's gravity would create a similar small variance upon the pressure difference.

Accordingly, an object of the present invention is to provide a closed loop, self-perpetuating energy system in which solar energy, whether direct or indirect, vaporizes water in substantially a pure form from oceanic and continental water sources with the vapor rising in the atmosphere of the earth to form vapor clouds. These clouds are swirled by the coriolis effect and pressure differentials within the atmosphere to form the general weather system with water being condensed from the vapor clouds to form rain which drops back to earth in the form of various types of precipitation in substantially its pure form.

When rain or other forms of precipitation falls at high continental elevation, the runoff of water is stopped or retarded in its attempt to get to the center of the earth due to gravity pull by the use of dams and at the dam sites, the water is filtered, purified or otherwise treated and then introduced to adequately sized and pressure rated pipelines which will flow and direct the water to larger main pipelines lying parallel with and at or near the base line of the mountains. From the base line, pipeline water will be flowed and directed to areas of lower terminal elevation for storage in underground aquifers or for any direct or indirect human or industrial need.

During the flow of water from high elevations to lower elevations, the water will generate pressure differentials between the water inside the pipeline and the atmosphere outside the pipeline. The pipeline wall interface and flow rate can be used to generate very large quantities of hydroelectric current by methods well understood by those in this field. Hydroelectric current energy can be used in various industrial processes by directing the pipeline directly into or near such industrial operations rather than utilize transmission lines for electrical energy. Step generation of electric current can be accomplished at various locations along the pipelines where sufficient elevation drop occurs. Large generation of electrical current can be used for the electrolysis separation of large volumes of hydrogen and oxygen gas from water which can be tapped from the pipeline. The separation, purification and compression and/or liquefaction of hydrogen and oxygen can be accomplished by use of available continuous electric current. Parallel separate pipelines for hydrogen and/or oxygen can be accomplished downstream from such separating facilities by compression flow and gravity fall.

The pipeline for the water can be directed into areas of low elevation, such as mountain valleys, then back to high elevation so long as the head at the pipeline beginning is maintained at capacity and the terminal end is at a lower elevation.

Another object of the present invention is to provide a closed loop, self-perpetuating energy system in accordance with the above description which is versatile in installation, efficient in use and capable of solving or alleviating energy shortages in many geographical areas.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENT

Figure 1:
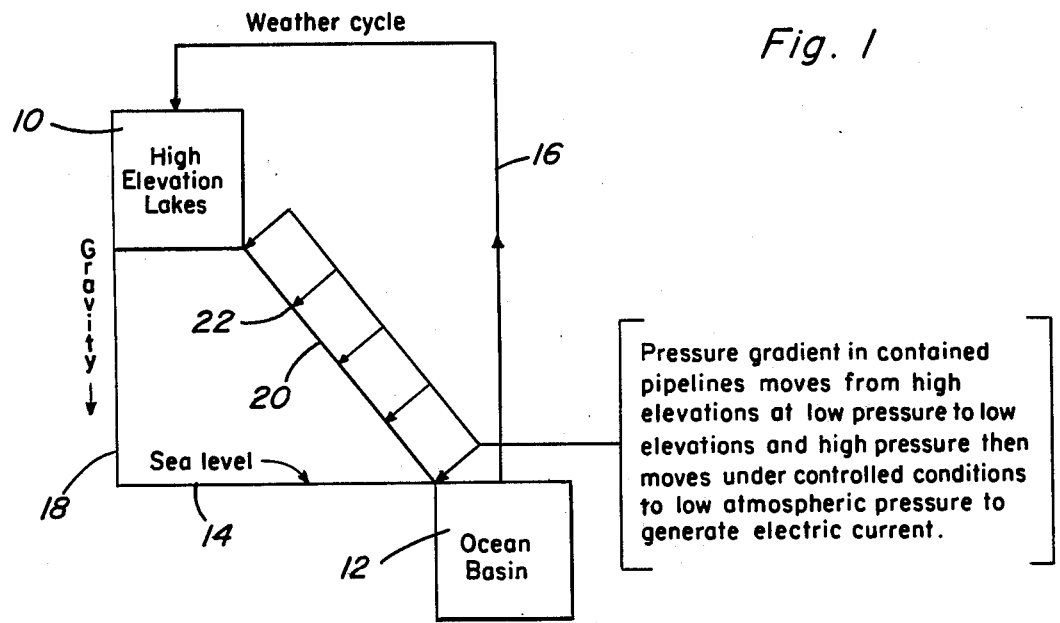
FIG. 1 is a schematic view illustrating the energy system of the present invention.

Referring now specifically to the drawings, FIG. 1 illustrates schematically a high elevation lake or lakes 10 and an ocean basin 12 at sea level 14. The natural weather cycle 16 vaporizes water from the ocean basin and deposits it in the high elevation lakes in a conventional and well-known manner. This water in the high elevation lakes will return to sea level by gravity flow as indicated by numeral 18 with such flow occurring along naturally established flow paths such as rivers, streams, and the like. In the present invention, a pipeline system 20 is provided for gravity flow of water from the high elevation lakes 10 to the ocean basin 12 at sea level 14 with the pipelines maintaining the water fresh and unpolluted so that it can be discharged into aquifers, underground reservoirs, or other storage means, at or adjacent sea level for various uses as may be necessary. In addition, the pipeline 20 includes a plurality of generating stations 22 at desired and convenient elevations with one of these stations being schematically illustrated in FIG. 2.

Figure 2:
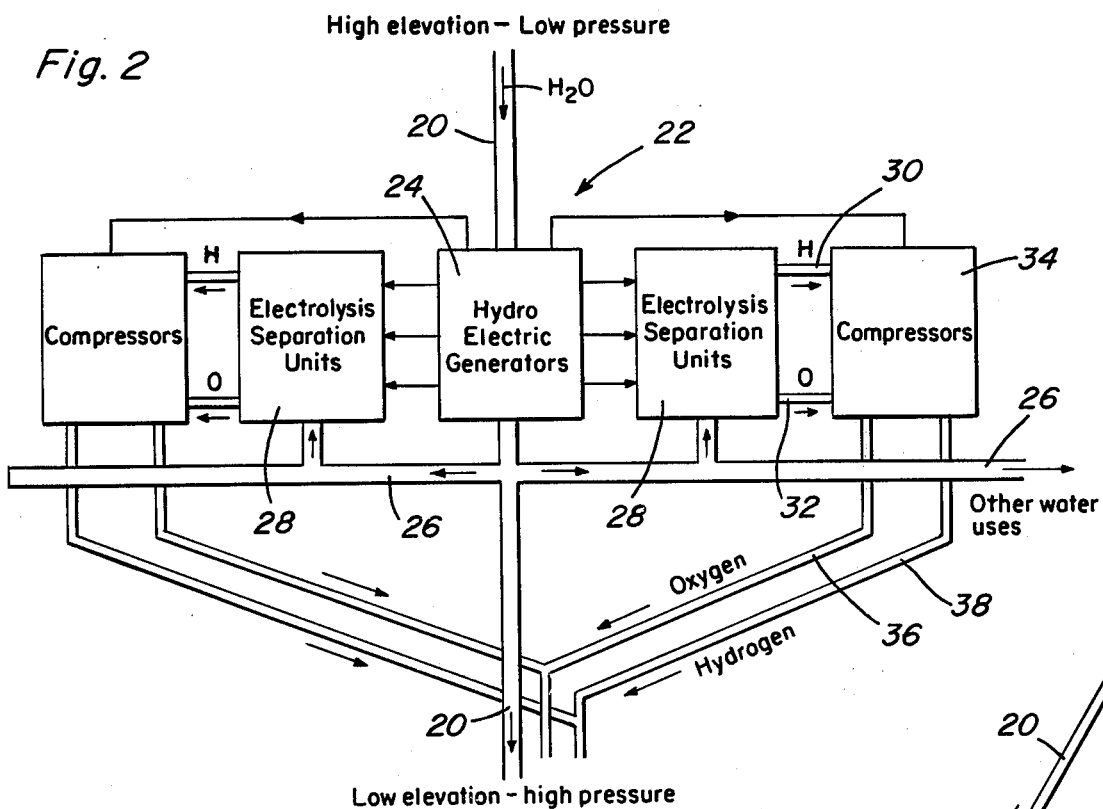
FIG. 2 is a more detailed schematic view illustrating one of the generating stations in this system.

As illustrated in FIG. 2, one of the stations 22 includes hydroelectric generators 24 associated with the pipeline 20 through which fresh unpolluted water is flowing from a high elevation low pressure to a low elevation high pressure in order to provide a high pressure gradient in the pipeline for efficiently driving the hydroelectric generators. Each station 22 may also include branch lines 26 from the pipeline 20 on the downstream side of the generators 24 to provide water for various purposes including water flow into electrolysis separation units 28 which are provided with electrical current from the hydroelectric generators which produces hydrogen gas for discharge through a pipeline 30 and oxygen gas for discharge through a pipeline 32 into compressor units 34 to compress and/or liquefy the oxygen and hydrogen for flow through lines 36 and 38 to a desired point of use. The hydroelectric generators may also produce electrical energy for any desired use which may be transmitted to the desired site by conventional transmission lines or the like with the gravity flow of water continuing down the pipeline 20 to the next station 22.

Figure 3:
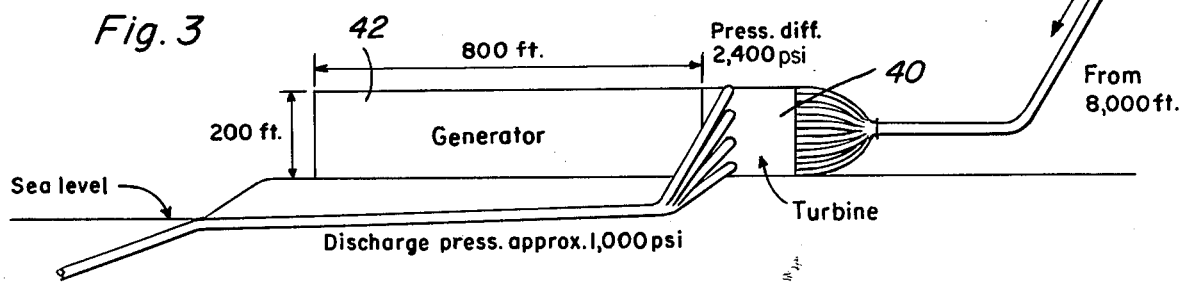
FIG. 3 is another schematic view illustrating a generating station adjacent sea level.

FIG. 3 illustrates schematically a typical generator in which the water in the pipeline 20 has a hydrostatic head of approximately 8,000 feet with the water entering turbine 40 with a differential pressure across the turbine of approximately 2,400 psi and a discharge pressure of approximately 1,000 psi. In such an installation, the generator 42 may be quite large, on the order of 800 feet in length and 200 feet in diameter. The generator would turn at a fairly slow RPM with the flow rate of water through the turbine being relatively slow due to the high differential pressure and the speed of the armature across the fields. A bank of generators of this size would supply considerable current and the discharge from the turbines may be into an underground aquifer or any storage area or directly into the ocean basin or the like.

The use of this system provides various advantages as compared with existing systems. For example, as water becomes available at the source dam sites, it would be moved down the pipelines to do work and go into underground storage or for direct uses, thus eliminating massive evaporative losses that occur in lake storage and with adequate management, water would be available 100% of the time by controlled flow and controlled lake storage. The generation of electrical current in this system would be non-polluting as opposed to the high pollution factors in most of the currently used large power generation systems for the generation of electrical current. Step or repeat generation of electrical current using gravity fall would far exceed the current producing efficiency factors in the systems now in use. Gravity fall does not have entropy losses as all other systems now in use have, thereby providing maximum efficiency over long spans of time. The high volume separation of hydrogen from water can be used for mobile energy used in internal combustion engines thereby lowering or ultimately eliminating the use of hydrocarbons in internal combustion engines. The use of hydrogen in internal combustion engines would also substantially reduce or eliminate pollutant laden exhaust gases and return the hydrogen and oxygen to the environment for reuse. The on-site generation of electrical current would substantially reduce current losses in mining, smelting and industrial uses from transmission of electrical current over long distance. Also, turbine wheel replacement and overhaul cost would be reduced due to lower temperature operation. The mass storage of underground fresh water would vastly reduce the water contamination and availability problem that could be a substantial problem in the event of the occurrence of nuclear warfare of other similar possible contamination of surface water. Drought problems which occur frequently could be lowered by creating a fresh water balance by storage of large volumes of water in aquifers in areas that frequently suffer cyclic drought. This system also will stabilize various continental areas that are now slowly returning to deserts and becoming uninhabitable. The provision of fresh unpolluted water for human consumption will result in substantial reduction in sickness and death from contaminated water which occurs in many areas including large coastal cities. This system will create a commerce and trade between wet and arid countries where topographical conditions are favorable and will lower or eliminate a balance of trade problem in high fuel consumption countries and greatly lower worldwide pollution problems in both the atmosphere and in continental waterways. This system will create more economically operable industrial chemical complexes that use large volumes of hydrogen, oxygen, water and electrical current. This system will increase the overall standard of living in any country using this system on a large scale by lowering the cost and increasing the efficiency of those services and products by providing relatively inexpensive hydroelectric power, water, hydrogen and oxygen. The system includes flexibility by being fully extendible at either end of the system or by lateral extension of the system at midpoints as may be required with the system providing long term reliability and safety. This system will also make large scale fresh water controlled aquaculture more feasible thereby providing large volumes of essential proteins for human consumption. This system would reduce the use of materials as compared with expansion and maintenance of the systems now in use and would substantially reduce atmospheric oxygen use and at the same time reduce upper atmospheric pollution. This system, once installed and properly engineered would provide a longer and more reliable life and would not require high technological operational and maintenance cost which are required by many of the present large systems now in use and would also eliminate volume residue to dispose of, such as radioactive waste, coal ash, and the like.

Installation of the system is relatively simple and requires the use of conventional technology. After installation and previous to start-up of the system, the pipelines would be cleaned and flushed and following this, the entire system would be filled to capacity with water and all air would be bled from the system at the high places along the pipeline. At the conclusion of the cleaning, filling and de-airing of the system, it is ready to be put in use to deliver water, electrical power, hydrogen, oxygen and associated services. Control of the system is accomplished rather easily by providing computer summation from meter stations in order to maintain an input to output balance by computing total output of fluid and transmitting the values to the source dam sites and balancing the input at each dam site in relation to the availability of water at each site and the needs of the system. The entire system would be maintained in a 100% full capacity at all times or as near these values as possible in order to maintain constant pressure values throughout the system and to prevent the entry of air or gases. This provides a continuous high pressure differential between the water pressure inside the pipe and the atmospheric pressure outside the pipe thereby fulfilling a definition of energy, as any high pressure or potential differential across a controllable interface, in which the controllable interface is the walls of the pipe which is maintained by proper and adequate flanging, valving or other manual or automatic means, as well understood by those in the hydraulic engineering field, will establish controlled flow between the two pressure areas.

There has been and will continue to be an intense and costly search conducted for an economical, clean, reliable, safe and non-depletable source or alternative source of usable energy. Many efforts, both governmental and private, have been made to explore all possible energy sources since depletion of current energy sources would drastically lower the standard of living of all human beings.

In addition, water supply is also a continuing problem and possibly more critical than energy supply and many efforts have been made to provide and maintain an adequate supply of fresh unpolluted water for human and animal consumption and also for agricultural use.

The present system, although quite simple and economical, will greatly alleviate, if not solve, both the energy supply and water supply problems. This system uses for its dynamic forces both gravity and electromagnetic radiation with both of these forces being stable and available. Gravity works in one direction and electromagnetic force (solar) works in the other direction with the system being a closed loop system. This system overcomes problems which exist with the present and past systems of dam-reservoir-generator sequences in which the controllable gravity gradient is too narrow to build large differential hydrostatic pressures for massive electrical current generation, include too large of a feedback to the solar phase by evaporative losses in the reservoir thereby reducing the availability of additional water for power generation, a large increase over a period of time of reservoir salinity and mineralization due to the evaporative losses and continental evaporation entering the dynamic weather system which loses most of its water as rain or other precipitation which flows into ocean basins without being used either as an energy source or as a fresh water supply.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An energy system comprising water stored in means at a high elevation under low pressure, pipeline means for conveying the water to a lower elevation under high pressure, said pipeline means serving to maintain the water fresh and unpolluted and to reduce evaporative losses, at least one hydroelectric generating station in the pipeline means utilizing pressure differentials between the interior of the pipeline means and atmosphere to generate electrical energy, at least one electrolysis separation unit operably associated with said pipeline means, said at least one electrolysis separation unit serving to convert a portion of said water into hydrogen and oxygen gas, said at least one electrolysis separation unit utilizing and being operable by electrical energy supplied by said at least one hydroelectric generating station, compressor means for collecting and delivering said oxygen and hydrogen gas for a desired use, said compressor means also being operable by electrical energy supplied by said at least one hydroelectric generating station, whereby said water is used to create the electrical energy necessary for its own hydrolysis into oxygen and hydrogen gas.

2. The system as defined in claim 1 wherein said pipeline means includes lateral branch lines for supplying fresh unpolluted water to said at least one electrolysis separation unit for producing said hydrogen and oxygen gas, said separation unit in communication with said compressor means having separate discharge lines for said hydrogen and oxygen gas for use thereof as a fuel or other purposes.

3. The system as defined in claim 2 wherein the pipeline means discharges said water at a terminal lower elevation into an underground aquifer storage means.

4. The system as defined in claim 3 wherein the general weather cycle forms a part of the system to vaporize water and precipitate it at the higher elevation thereby providing a closed loop, self-perpetuating energy system.

5. The method of providing a closed loop, self-perpetuating energy system utilizing gravity flow of water and a natural weather cycle consisting of the steps of confining fresh unpolluted water at a high elevation source such as in a wet mountainous region, connecting a pipeline to the high elevation source of water with the pipeline extending to a substantially lower elevation for gravity flow of said water from said high elevation source at low pressure to said lower elevation at high pressure while maintaining the water in a fresh and unpolluted condition and eliminating evaporative losses during such gravity flow, discharging the fresh unpolluted water at said lower elevation such as a coastal plain for various uses or storage in underground aquifers and the like, providing a plurality of hydroelectric generating stations at different elevations in the pipeline for producing electrical energy by utilizing the pressure differential between an interior of the pipeline and the atmosphere at said plurality of elevations, and providing a plurality of electrolysis separation units operably associated with said hydroelectric generating stations and utilizing a portion of said water to separate the same into hydrogen and oxygen gas, said electrolysis separation units being operated by electrical power supplied by said hydroelectric generating stations, whereby said water creates the electrical energy required for its own hydrolysis into oxygen and hydrogen gas.

6. The method as defined in claim 5 wherein at least certain of the steps of providing generating stations includes the step of providing branch water lines connected with the pipeline and the step of connecting said electrolysis separation units to the branch lines and the hydroelectric generating station for separating said hydrogen and oxygen from water for supplying hydrogen and oxygen to various sites for use.

* * * * *